C. H. BISSELL.
EXTENSION FOR CONDUIT OUTLET BOXES.
APPLICATION FILED JUNE 21, 1918.

1,424,443.

Patented Aug. 1, 1922.

INVENTOR
Carl H. Bissell.
BY
Parsons & Bodell.
ATTORNEYS.

UNITED STATES PATENT OFFICE.

CARL H. BISSELL, OF SYRACUSE, NEW YORK, ASSIGNOR TO CROUSE-HINDS COMPANY, OF SYRACUSE, NEW YORK, A CORPORATION OF NEW YORK.

EXTENSION FOR CONDUIT OUTLET BOXES.

1,424,443.  Specification of Letters Patent.  Patented Aug. 1, 1922.

Application filed June 21, 1918. Serial No. 241,223.

*To all whom it may concern:*

Be it known that I, CARL H. BISSELL, a citizen of the United States, and a resident of Syracuse, in the county of Onondaga and State of New York, have invented a certain new and useful Extension for Conduit Outlet Boxes, of which the following is a specification.

This invention has for its object a particularly simple and efficient extension for conduit outlet boxes which is attachable thereto by the same means that electrical appliances or covers as porcelain covers are attachable to the box or is interchangeable with said appliance or covers.

The invention consists in the novel features and in the combinations and constructions hereinafter set forth and claimed.

In describing this invention, reference is had to the accompanying drawings in which like characters designate corresponding parts in all the views.

Figure 1:
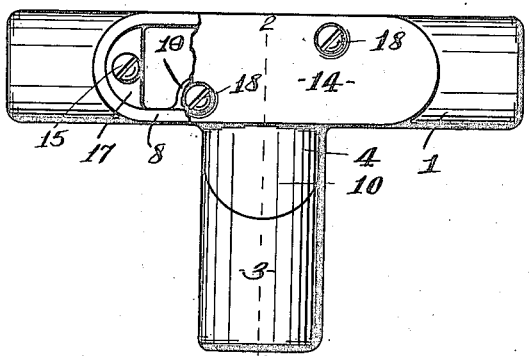
Figure 1 is a plan view partly broken away, of a conduit outlet box provided with my extension.
Figure 2:
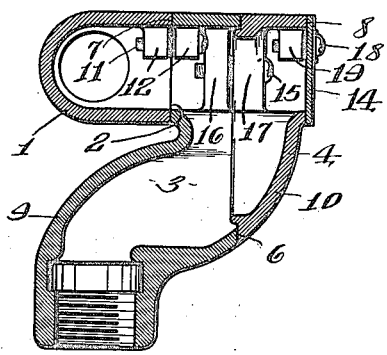
Figure 2 is a sectional view on line 2—2, Fig. 1.
Figure 4:
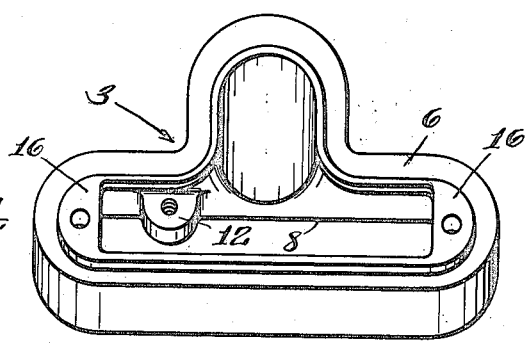
Figure 4 is an inverted view similar to Fig. 3 of the upper section.
Figure 3:
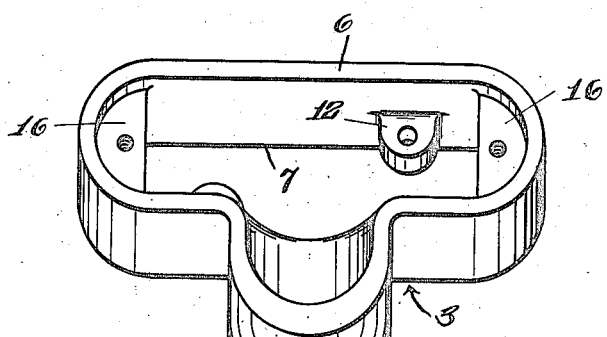
Figure 3 is a detail view in perspective of the lower section of the extension.

This extension is mountable upon the open side of a conduit outlet box in the place formerly occupied by the electrical appliances or closures and includes upper and lower sections which are open at their upper and lower sides and also at their abutting sides, and a pipe leading from the extension, the plane of division between the sections cutting through the pipe where it joins the extension, so that upon removal of the upper section for the purpose of placing the wires through the lower section, the pipe is opened to facilitate the placing of the wires.

1 is the conduit outlet box which is open at one side as 2.

3 and 4 are the inner and outer sections of the extension, these sections being elongated in general form to conform to the open side 2 of the conduit outlet box. These sections are open at their abutting sides 6 and also at their upper and lower sides 7 and 8 respectively.

9 is the pipe leading from the extension and as here shown, the pipe leads from the extension and curves toward the conduit outlet box and is in the general form of a goose neck or an S shape, and the plane of division between the sections 3, 4 and diametrically through the pipe where it communicates with the sections 3, 4. Thus, a cap portion 10 of the pipe is carried by the outer section 4 of the extension, and when the outer section 4 is removed, wires located in the box 1 can be readily drawn through the extension section 3 and threaded through the pipe 9. The lower section 3 is connected to the box 1 by screws 11 extending through internal lugs arranged obliquely opposite each other in the box 1 near the open side and in the section 3 near the lower or inner edge thereof, the lugs 12 of the box being also utilized to receive the fastening screws of electrical appliances and closures mounted on the box when the extension is not used, such as the closure 14 at the open side of the outer extension 4. Hence, the extension is interchangeably mountable with the appliances or closures on the outlet box.

The upper section 4 is secured to the lower section by screws 15 extending through webs 16 and 17 at the ends of the sections 3, 4. The closure 14 is mountable on the outer open side of the section 4 by screws 18 threading in the lugs 19 located in the outer section 4 in the same relative position as the lugs 12 of the box so that the closure 14 is interchangeably mountable upon the box 2 and the extension.

This extension is particularly advantageous in that it can be used in connection with a standard outlet box or "condulet" to lead off a branch electric conduit.

What I claim is:

1. The combination with a conduit outlet box having means formed with a passage for receiving the end of an electric conduit, the box being open at one side, of an extension comprising a section mountable upon the open side of the box and being open at its opposite side and another section mountable upon such open side of the first-mentioned section, the extension having a curved neck portion extending at an angle to the axis of the conduit connection of the box and the plane of division between the sections extending through the curved neck portion where it joins the extension, means for securing the first mentioned section to the box, and means for securing the sections together, substantially as and for the purpose described.

2. The combination with a conduit outlet box open at one side, of an extension including a section mountable upon the open side of the box and being also open on its side opposite the open side of the box, and a section closing the open side of the former section remote from the box, the extension having a curved neck and the plane of division between the sections extending through the curved neck where it joins the sections whereby when the outer section is removed access is had, in straight lines, to the interior of the box through the first-mentioned section and to the interior of the neck at the angle thereof, substantially as and for the purpose specified.

3. The combination of a conduit outlet box having an opening in the side thereof opposite the bottom of the box, an extension mounted on the open side and including upper and lower sections open at their abutting sides, of an angular neck connected to the extension, the plane of division between the sections extending through the angular neck where it joins the sections and the free end of the neck having its rear face located in substantially the plane of the outer face of the bottom of the box, substantially as and for the purpose set forth.

In testimony whereof, I have hereunto signed my name, at Syracuse, in the county of Onondaga, and State of New York, this 14th day of June, 1918.

H. BISSELL.